(12) United States Patent
Beidel

(10) Patent No.: US 9,207,303 B2
(45) Date of Patent: Dec. 8, 2015

(54) SYSTEM AND METHOD FOR LOCATING A MOBILE DEVICE

(71) Applicant: Christopher Thomas Beidel, Glendale, WI (US)

(72) Inventor: Christopher Thomas Beidel, Glendale, WI (US)

( * ) Notice: Subject to any disclaimer, the term of this patent is extended or adjusted under 35 U.S.C. 154(b) by 0 days.

(21) Appl. No.: 14/212,697

(22) Filed: Mar. 14, 2014

(65) Prior Publication Data

US 2014/0274127 A1    Sep. 18, 2014

Related U.S. Application Data

(60) Provisional application No. 61/791,196, filed on Mar. 15, 2013.

(51) Int. Cl.
| | |
|---|---|
| *H04W 4/02* | (2009.01) |
| *G01S 5/00* | (2006.01) |
| *H04W 64/00* | (2009.01) |
| *H04W 88/08* | (2009.01) |
| *G01S 5/02* | (2010.01) |
| *G01S 5/14* | (2006.01) |

(52) U.S. Cl.
CPC .............. *G01S 5/00* (2013.01); *G01S 5/0284* (2013.01); *G01S 5/14* (2013.01); *H04W 64/00* (2013.01); *H04W 88/08* (2013.01); *H04W 4/02* (2013.01)

(58) Field of Classification Search
CPC ....... H04W 4/02; H04W 64/00; H04W 88/08; H04W 4/025; G01S 5/14; G01S 5/00; G01S 5/0284

See application file for complete search history.

(56) References Cited

U.S. PATENT DOCUMENTS

| | | | |
|---|---|---|---|
| 6,674,403 | B2 | 1/2004 | Gray et al. |
| 6,819,286 | B2 | 11/2004 | Armbruster et al. |
| 6,912,373 | B2 | 6/2005 | Lee |
| 6,995,708 | B2 | 2/2006 | Schmidt |
| 7,113,763 | B2 | 9/2006 | Heinonen et al. |
| 7,751,829 | B2 | 7/2010 | Masuoka et al. |
| 7,825,794 | B2 | 11/2010 | Janetis et al. |
| 7,941,096 | B2 | 5/2011 | Perkins et al. |

(Continued)

FOREIGN PATENT DOCUMENTS

| | | |
|---|---|---|
| CN | 101504452 A | 8/2009 |
| CN | 101505450 A | 8/2009 |

(Continued)

OTHER PUBLICATIONS

Giaglis et al., "On the Potential Use of Mobile Positioning Technologies in Indoor Environments," 15th BLED Electronic Commerce Conference, eReality: Constructing the eEconomy, BLED, Slovenia, Jun. 17-19, 2002, pp. 413-429.

(Continued)

*Primary Examiner* — Ajit Patel
(74) *Attorney, Agent, or Firm* — Quarles & Brady LLP

(57) ABSTRACT

A system and method for locating a mobile device are presented. A mobile device is configured to transmit a beacon signal encoding an identifier of the mobile device. A relay device has a known location and is configured to receive the beacon signal from the mobile device, the beacon signal having a signal level, encode the identifier of the mobile device, the signal level, and an identifier of the relay device into a message, and transmit the message. A console device is configured to decode the message received from the relay device to identify an approximate location of the mobile device.

18 Claims, 6 Drawing Sheets

(56) References Cited

U.S. PATENT DOCUMENTS

| | | |
|---|---|---|
| 8,023,895 B2 | 9/2011 | Smith |
| 8,040,219 B2 | 10/2011 | Haartsen et al. |
| 2003/0054813 A1* | 3/2003 | Riley et al. .................... 455/424 |
| 2003/0174049 A1 | 9/2003 | Beigel et al. |
| 2004/0166873 A1* | 8/2004 | Simic et al. ................ 455/456.1 |
| 2007/0247307 A1 | 10/2007 | Riep |
| 2008/0020705 A1* | 1/2008 | MacConnell .................... 455/15 |
| 2008/0036647 A1 | 2/2008 | Jung |
| 2008/0220720 A1 | 9/2008 | Ashley et al. |
| 2008/0280624 A1 | 11/2008 | Wrappe |
| 2009/0061899 A1* | 3/2009 | Hwang et al. .............. 455/456.2 |
| 2009/0207014 A1 | 8/2009 | Ayed |
| 2010/0121567 A1 | 5/2010 | Mendelson |
| 2011/0211563 A1 | 9/2011 | Herrala et al. |
| 2011/0237226 A1 | 9/2011 | Dhuna |
| 2011/0250906 A1* | 10/2011 | Siomina et al. ............ 455/456.2 |
| 2012/0056741 A1 | 3/2012 | Zhu |
| 2012/0154115 A1 | 6/2012 | Herrala |
| 2012/0166077 A1 | 6/2012 | Herzog et al. |
| 2012/0223834 A1 | 9/2012 | Hyatt |
| 2012/0264447 A1 | 10/2012 | Rieger, III |
| 2012/0264454 A1 | 10/2012 | Agardh et al. |
| 2013/0246784 A1* | 9/2013 | Zhang et al. .................. 713/153 |

FOREIGN PATENT DOCUMENTS

| | | |
|---|---|---|
| IN | 3034CHE2009 | 6/2011 |
| WO | 2004040857 A2 | 5/2004 |

OTHER PUBLICATIONS

Rodriguez et al., "In-building location using Bluetooth," Departamento de Electrónica e Sistemas, Universidade da Coruña, in In Proceedings of the International Workshop on Wireless Ad Hoc Networks, 2005, 5 pages.

Thapa et al., "An Indoor Positioning Service for Bluetooth Ad Hoc Networks," Department of Computer & Information Sciences, Minnesota State University, Mankato, 11 pages.

PCT International Search Report issued in International Publication No. WO2004/040857A3, mailed Jun. 6, 2004, 8 pages.

* cited by examiner

SYSTEM AND METHOD FOR LOCATING A MOBILE DEVICE

BACKGROUND

There are many circumstances in which it can be useful to know the location of an individual. In a hospital or care home, it may be useful to know the location of various individuals to ensure that they are not moving about when it is inadvisable to do so, or entering off-limits areas. In a commercial venue, it may be useful to identify the location of patrons so as to update or modify one or more elements in their surroundings, such as ambient music, lighting, and the like. For teachers, it may be useful to identify the location of students.

SUMMARY

Some embodiments of the invention provide a system and method for locating a mobile device. The mobile device can use Bluetooth low energy (BLE) messages to transmit a beacon signal encoding an identifier of the mobile device. The beacon signal of the mobile device is received by a relay device. The received beacon signal has a signal level. The relay device has a known location within a particular area. The relay device, after receiving the beacon signal from the mobile device, transmits a signal encoding the identifier of the mobile device, an identifier of the relay device, and the signal level. The signal transmitted by the relay device is received by a console device that decodes the signal received from the relay device to identify a location of the mobile device.

In one embodiment, a system includes a mobile device configured to transmit a beacon signal encoding an identifier of the mobile device, and a relay device having a known location. The relay device is configured to receive the beacon signal from the mobile device, the beacon signal having a signal level, encode the identifier of the mobile device, the signal level, and an identifier of the relay device into a message, and transmit the message. The system includes a console device configured to decode the message received from the relay device to identify an approximate location of the mobile device.

In another embodiment, a relay device includes a processor, the processor being configured to receive a beacon signal from a mobile device. The beacon signal encodes an identifier of the mobile device and having a signal level. The processor is configured to encode the identifier of the mobile device, the signal level, and an identifier of the relay device into a message, and transmit the message to a console device configured to decode the message received from the relay device to identify an approximate location of the mobile device.

In another embodiment, a method includes receiving a beacon signal from a mobile device. The beacon signal encodes an identifier of the mobile device and has a signal level. The method includes encoding the identifier of the mobile device, the signal level, and an identifier of a relay device into a message, and transmitting the message to a console device configured to decode the message to identify an approximate location of the mobile device.

DETAILED DESCRIPTION

Figure 1:
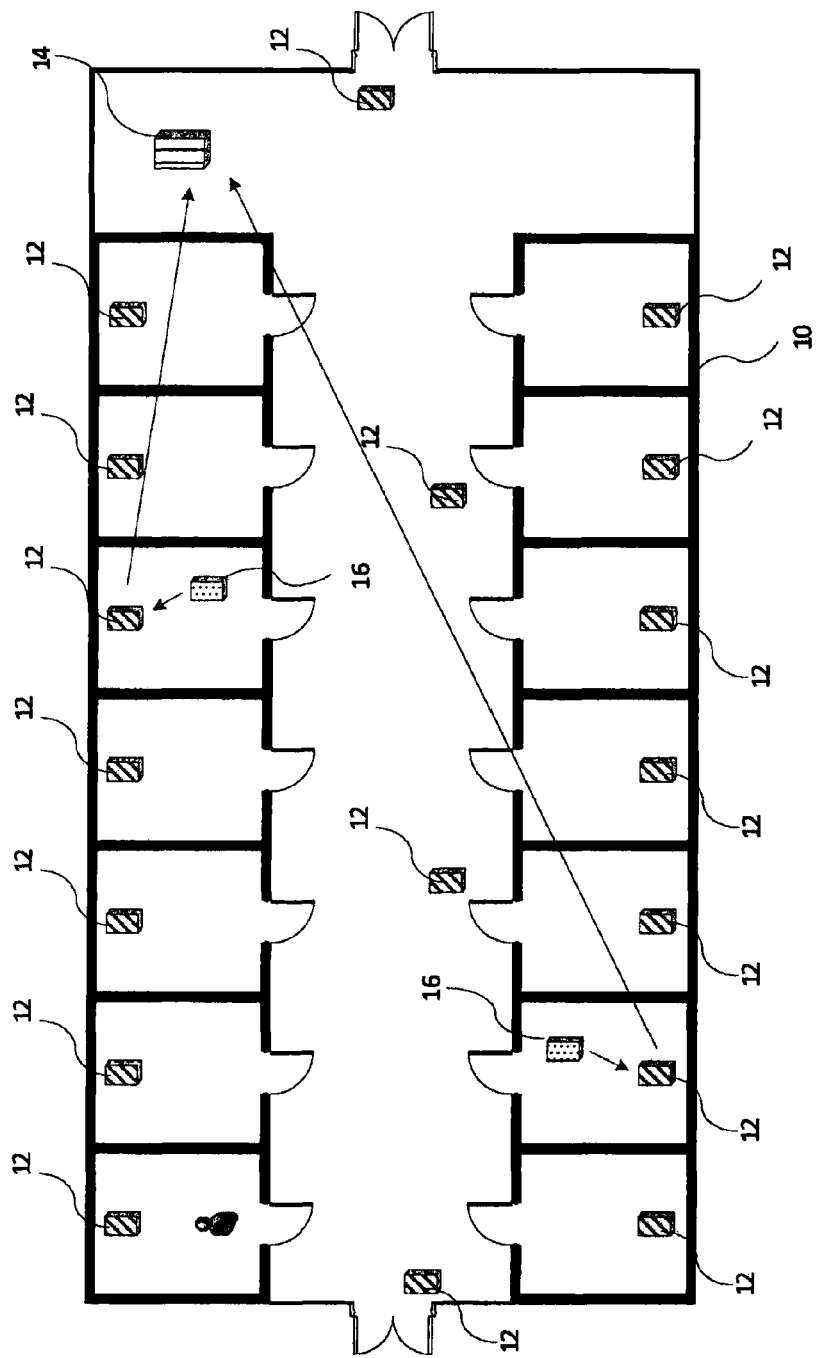
FIG. 1 is an illustration of an example environment in which the present system may be utilized.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The present system enables the determination or estimation of a location of a portable electronic device within a given area or region. Although the present disclosure describes the system in terms of locating a mobile device, such as a wearable bracelet, within a floor of a building, or a building generally, it will be appreciated by persons of ordinary skill in the art that the present system may be used in many different environments to locate mobile electronic devices having different form factors in many different types of areas.

In one example implementation, the present system may be utilized to locate patients within a hospital or a care facility. In such an implementation, the patients may wear bracelets that operate as mobile devices configured to broadcast a beacon signal. That beacon signal can then be detected by one or more relay devices that are disposed about the region in which the patients will be located. Depending upon the identity of the relay device that detects the patient's bracelet and the identity of the detected bracelet, a location of the patient can be estimated. This information may be used, for example, to generate a warning that a patient is moving about when or where it is dangerous to do so, when an individual is approaching a private area, or when an individual is approaching an off-limits area.

In other implementations, the present system may be used to monitor the movement of patrons through a gallery, such as an art gallery or museum. In that case, the location of the various patrons within the gallery can be used to change or control the exhibits that are presented within the gallery or to provide the patrons with information about nearby exhibits.

In other implementations, the present system may be used to monitor the movement of assets such as equipment through a facility such as a warehouse or business. In that case, the equipment has one or more affixed beacon tags that operate as mobile devices configured to broadcast a beacon signal. That beacon signal can then be detected by one or more relay devices that are disposed about the region in which the assets will be located. Depending upon the identity of the relay device that detects the asset's tag and the identity of the detected asset, a location of the asset can be estimated. In that case, the location of the various assets within the facility can be used to monitor the location of the various assets for accountability, tracking, inventory, and security.

FIG. 1 is an illustration of an example environment in which the present system may be utilized. FIG. 1 shows a floor plan 10 including a number of different rooms or offices. Relay devices 12 are positioned in each of the rooms of floor plan 10. Each relay device 12 is configured to broadcast a unique identifier that allows each relay device 12 to be uniquely identified. The location of each relay device 12 is known. For example, console device 14 may store a database that relates the identity of each relay device 12 to a particular location within floor plan 10. Accordingly, the unique identifiers of each relay device 12 are associated with the particular room in which the relay device 12 is located. As such, upon receipt of a relay device 12 signal having a particular identifier, it is possible to also identify the room in which the transmitting relay device 12 is located.

Mobile devices 16 are also present within floor plan 10 and are generally free to move about floor plan 10. Each mobile device 16 is configured to wirelessly transmit a beacon signal that includes a unique identifier of the mobile device 16. Generally, mobile devices 16 are configured in a relatively small form factor, so as to be easily carried or worn by a user. For example, mobile devices 16 may be bracelets worn by a user, or relatively small devices that may be placed into a pocket.

Generally, mobile devices 16 utilize a relatively low-power transmission protocol, ensuring that their beacon transmissions are not received over a relatively large area. The signals transmitted by mobile devices 16 are configured to be received by relay devices 12. However, as the broadcast range of the mobile devices 16 is relatively limited, the signals transmitted by the mobile device 16 are generally only received by relay device 12 that are in relatively close proximity.

Relay devices 12 are configured to detect the beacon signals transmitted by mobile devices 16 and decode those signals to retrieve the identifier of the transmitting mobile device 16. After receiving a signal from a mobile device 16, the relay devices 12 are configured to transmit data either wired or wirelessly, that includes both the identifier for the mobile device 16 as well as the identifier of the relay device 12. In some implementations, the beacon signal of the relay devices 12 also includes the received signal level of the signal received from the mobile device 16.

Console device 14 is configured to receive the signals transmitted by relay devices 12. Console device 14 may comprises a single system or device configured to receive communications from one or more relay devices 12. Alternatively, console device 14 may include a plurality of separate systems or devices that are each configured to receive signals from the relay devices 12. That data can then be aggregated and analyzed by the multiple console devices 14. The signals transmitted by relay devices 12 may include wireless signals or, alternatively, the signals may be transmitted from relay devices 12 to console device 14 using a wired connection. Console device 14 can then process the received signals to retrieve both the identifier of the relay device 12 that transmitted the signal, as well as the encoded identifier of the mobile device 16 that was also included within the signal transmission. In some implementations, the transmitted signal of the relay devices 12 also includes the received signal level of the signal received from the mobile device 16.

Having retrieved both the identifier of a relay device 12 and a mobile device 16, console device 14 can determine which of relay devices 12 transmitted the signal and, thereby, where the mobile device 16 was located, as discussed below. Or, if multiple signals were received from multiple relay devices 12 encoding the same mobile device 16 identifier, the console device 14 can analyze the received signal levels to determine to which relay device 12 the mobile device 16 was nearest.

In one implementation of the present system, mobile devices 16 are configured to utilize Bluetooth low energy (BLE) to transmit their beacon signals. This approach enables the battery life of the mobile devices 16 to last for an extended period of time. To further minimize battery consumption, the mobile device 16 may be configured to transmit their identifier beacon signals in BLE advertisement packets. By using advertisement messages or packets to carry the identifier payload, the mobile devices 16 can transmit information to relay devices 12, but the mobile devices 16 can do so without establishing a formal Bluetooth connection (i.e., the mobile devices 16 do not perform pairing, protocol handshaking, or any other communication or protocol handshaking with relay devices 12), further reducing battery consumption in mobile devices 16.

Similarly, relay devices 12 may be configured to utilize BLE for transmission to console device 14. As in the case of the mobile device 16, this enables relay devices 12 to utilize a reduced amount of power. In one implementation, the relay devices 12 may similarly use advertisement packets to transmit their own beacon signals that contain both the identifier of the detected mobile device 16 and the relay device's own identifier. In another implementation, relay devices 12 may use a wired connection to deliver mobile device 16 data to a console device 14.

An example BLE advertisement packet is illustrated in Table 1, below. The BLE advertisement packet can be as long as 31 octets (bytes). Per the BLE standard, each of the bytes is allocated to carry specific data or information. For example, bytes 1 through 3 are required to contain necessary header information, while byte 4 identifies the length of the universally unique identifier (UUID) for the service being used. A number of bytes (e.g., bytes 6-21) are utilized to identify the UUID of the device transmitting the advertising packet.

TABLE 1

| Byte # | Sample Data | Description |
|---|---|---|
| 1 | 02 | header |
| 2 | 01 | header |
| 3 | 05 | header |

TABLE 1-continued

| Byte # | Sample Data | Description |
|---|---|---|
| 4 | 11 | service UUID length (17 bytes - excludes self) |
| 5 | 07 | service field type code (complete 128-bit UUID) |
| 6 | F0 | UUID |
| 7 | FE | UUID |
| 8 | DF | UUID |
| 9 | 91 | UUID |
| 10 | 3C | UUID |
| 11 | F2 | UUID |
| 12 | 4F | UUID |
| 13 | A2 | UUID |
| 14 | E1 | UUID |
| 15 | 11 | UUID |
| 16 | 8A | UUID |
| 17 | F3 | UUID |
| 18 | 70 | UUID |
| 19 | DA | UUID |
| 20 | 48 | UUID |
| 21 | 38 | UUID |
| 22 | 09 | manf specific data field (9 bytes - excludes self) |
| 23 | FF | manf specific data field type |
| 24 | FF | manf |
| 25 | FF | manf |
| 26 | 64 | relay battery |
| 27 | 01 | data type |
| 28 | 34 | mobile device ID |
| 29 | 41 | mobile device ID |
| 30 | BC | mobile device RSSI |
| 31 | 41 | mobile device battery |

Bytes 26-31 of the advertisement packet are generally used to communicate manufacturer-specific data and, for a particular device, contain fixed values. Normally, these bytes are used to convey information such as model and version values. In the present system and method, however, bytes 26-31 are utilized to convey information used in the locating of a mobile device. Specifically, in one implementation as illustrated in Table 1, when the advertisement packet is transmitted by a relay device 12, byte 26 is encoded with a value representing a battery percentage of the transmitting relay device 12. Byte 27 encodes a data type for the information being transmitted. Currently, there are two data types when the advertisement is transmitted by a relay device 12—that of a data packet (e.g., encoding mobile device 16 information), or a heartbeat packet indicating a status of the relay device 12, but encoding no mobile device 16 information). As there are only two data types, only a single bit of byte 27 can be used to convey the data type information, accordingly, the remaining bits of byte 27 may be used to convey other information, as needed.

When transmitted as a data packet by a relay device 12, bytes 28-29 of the advertisement packet may encode an ID of a mobile device 16. In one implementation, the ID may comprise the last two characters of the mobile device 16's Bluetooth hardware address (BD_ADDR). In another implementation, the ID may be defined to hold a custom value. When transmitted by a relay device 12 as a data packet, byte 30 of the advertisement packet can be used to encode the received signal strength indicator (RSSI), measured in decibel-meters, of the broadcast message that was originally received by the relay device 12, triggering the relay device's data packet transmission, while byte 31 can be used to encode the battery percentage of the mobile device 16 that transmitted the broadcast message. Bytes 30 and 31 can also be used for other information because mobile device 16 RSSI and battery information can fit into a single byte.

A similar advertisement packet structure to that shown in Table 1 may be utilized by mobile device 16 when periodically transmitting their own broadcast messages that are configured to be detected by the relay devices, causing the relay devices to transmit their own advertisement packets to the console device.

To facilitate the interaction between the mobile devices 16, relay device 12, and console device 14 of the present system, a number of BLE services can be defined, where the mobile devices 16 and relay device 12 are configured to utilize the services to communicate the broadcast messages of the present disclosure. A first service (e.g., a "Flex Ad Service") is defined for the mobile devices 16 to transmit beacon signals. The Flex Ad Service sets forth a number of attributes for the mobile device 16, that can be both read from and written to, including:

Tx Power—The power setting for radio transmissions by mobile device 16.

Ad Interval—The time between Bluetooth radio advertisement beacon messages transmitted by the mobile devices 16.

Connectability—A flag that can be set to either allow or restrict other Bluetooth devices from connecting to the device generating the advertisement beacon message (e.g., a mobile device 16). When is disabled, the advertisement beacon messages are of a different type (ADV_NONCONN_IND as opposed to ADV_IND).

In addition to the Flex Ad Service, which is utilized by the mobile devices 16 to transmit their beacon messages, a Beacon Relay Service can be defined, which is utilized by relay devices 12 to transmit their own beacon messages. The Beacon Relay Service sets forth a number of attributes for the relay devices 12, including:

Broadcasts Enabled—A flag that determines whether a relay device 12 is allowed to rebroadcast tag data. Note that this flag is typically enabled in the present system.

Number of Rebroadcasts—An integer indicating a number of rebroadcasts that a relay device 12 will use to resend the tag data. Not that this value is typically 1.

Broadcast Interval—The time between receiving the tag data and the rebroadcasting it, and between rebroadcasts if more than one.

Heartbeat Enabled—A flag that determines whether a relay device 12 is to periodically transmit its heartbeat signal.

Heartbeat Interval—The time between relay device 12 heartbeat broadcasts. In one implementation, this interval is set to a default of 60 seconds.

Scan Duration—The amount of time that a relay device 12 will remain in "listening mode" waiting for transmission from mobile devices 16. This setting can be used to limit the power consumption of a relay device 12, which can be useful, for example, when the relay device 12 is battery powered.

Rx Sensitivity—This attribute sets the receiver sensitivity of a relay device 12. In one implementation, the attribute has two values—either a normal or high sensitivity setting.

In other implementations, though, relay devices 12 may utilize different wireless or wired communications protocols or systems to transmit data to console device 14. For example, although relay devices 12 may be configured to detect the advertisement transmissions made by mobile devices 16 using BLE communications, the relay devices 12 may transmit their own beacon signals to console device 14 using a WiFi, regular Bluetooth, or any other wireless transmission approach. Alternatively, rather than transmit wirelessly, the relay devices 12 may utilize a wired connection to transmit signals to console device 14. For example, if the relay devices 12 are distributed about a very large space, wireless communications may not be capable of allowing data transmission from every relay device 12 in the space to the console device 14. In that case, one or more of the relay devices 12 may utilize wired connections, while relay devices 12 that are closer to console device 14 may instead use wireless connections to transmit data to console device 14. Additionally, when the console is located remotely, relay devices 12 may use the Internet to transmit data to one or more console device 14. Some different data transmission technologies that may be utilized by the relay devices 12 include Bluetooth, Bluetooth with amplifiers, combinations of Bluetooth and BLE repeaters, Wi-Fi, Ethernet, and/or proprietary protocols using proprietary wiring.

In general, during operation of the present system, the mobile devices 16 transmit a beacon signal including their own identifier according to a predetermined schedule. For example, the mobile devices 16 may transmit beacon signals once every 15-30 seconds or, in some implementations, every 1-5 seconds, or even less than a second.

The relay devices 12 constantly listen for the beacon signal that may be transmitted by a nearby mobile device 16. If a beacon signal from a mobile device 16 is detected by the relay device 12, the relay device decodes the identifier of the mobile device 16 from the beacon signal. The relay device 12 then transmits its own signal that includes the identifier of the detected mobile device 16 as well as the identifier of the relay device 12 and the received signal level of the beacon signal received from the mobile device. The signal transmitted by the relay device 12 is received by the console device 14, where the signal is decoded and utilized to determine a location of the mobile device 16.

Figure 2A:
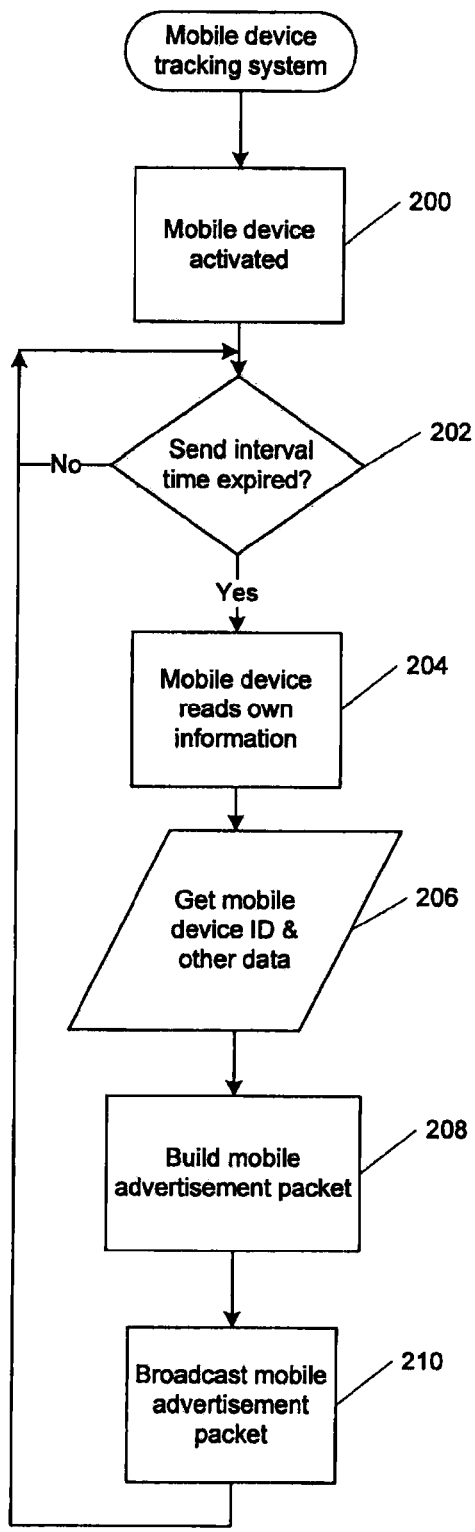
FIG. 2A is a flowchart showing a control loop for a mobile device of the present disclosure.
Figure 2B:
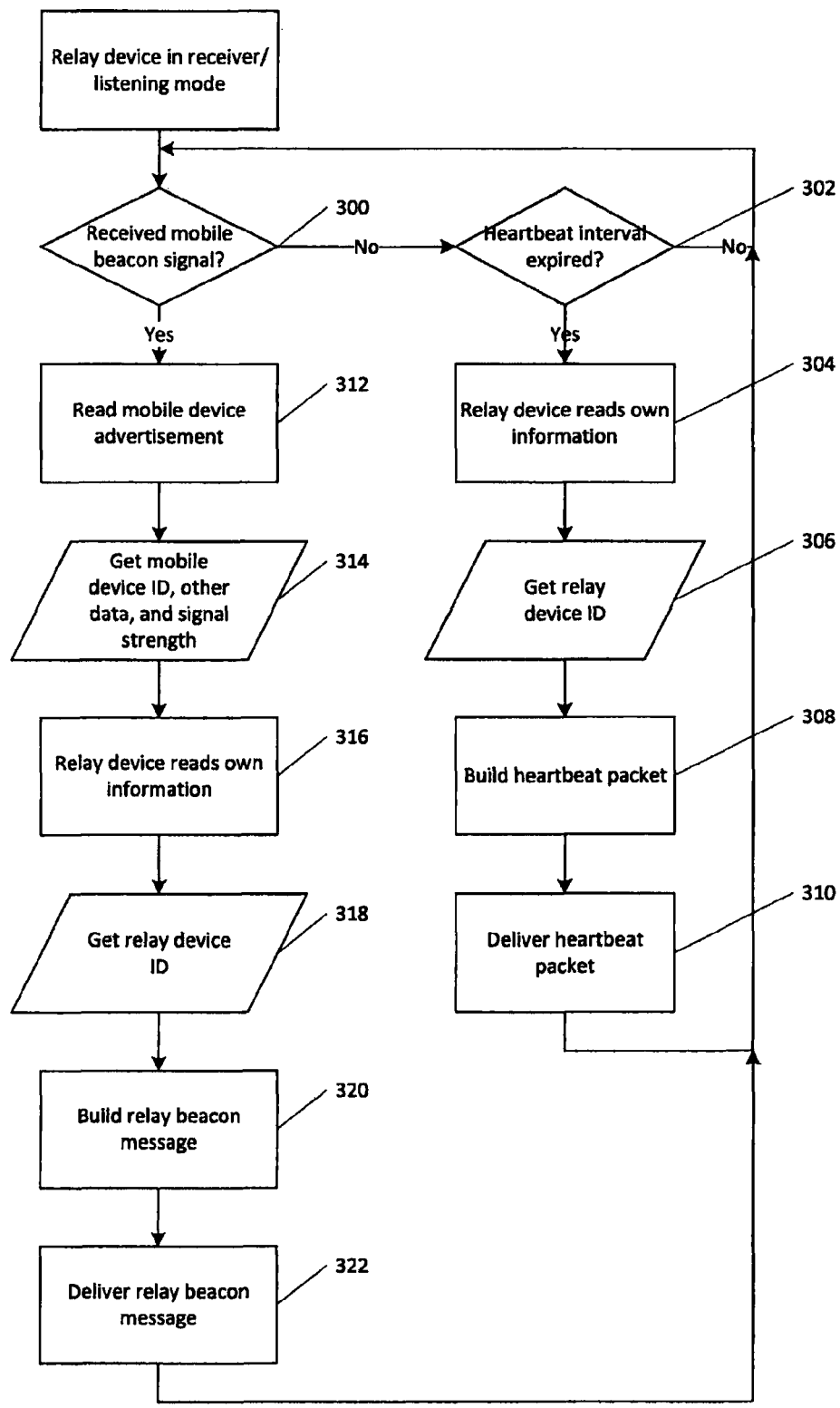
FIG. 2B is a flowchart showing a control loop for a relay device of the present disclosure.
Figure 2C:
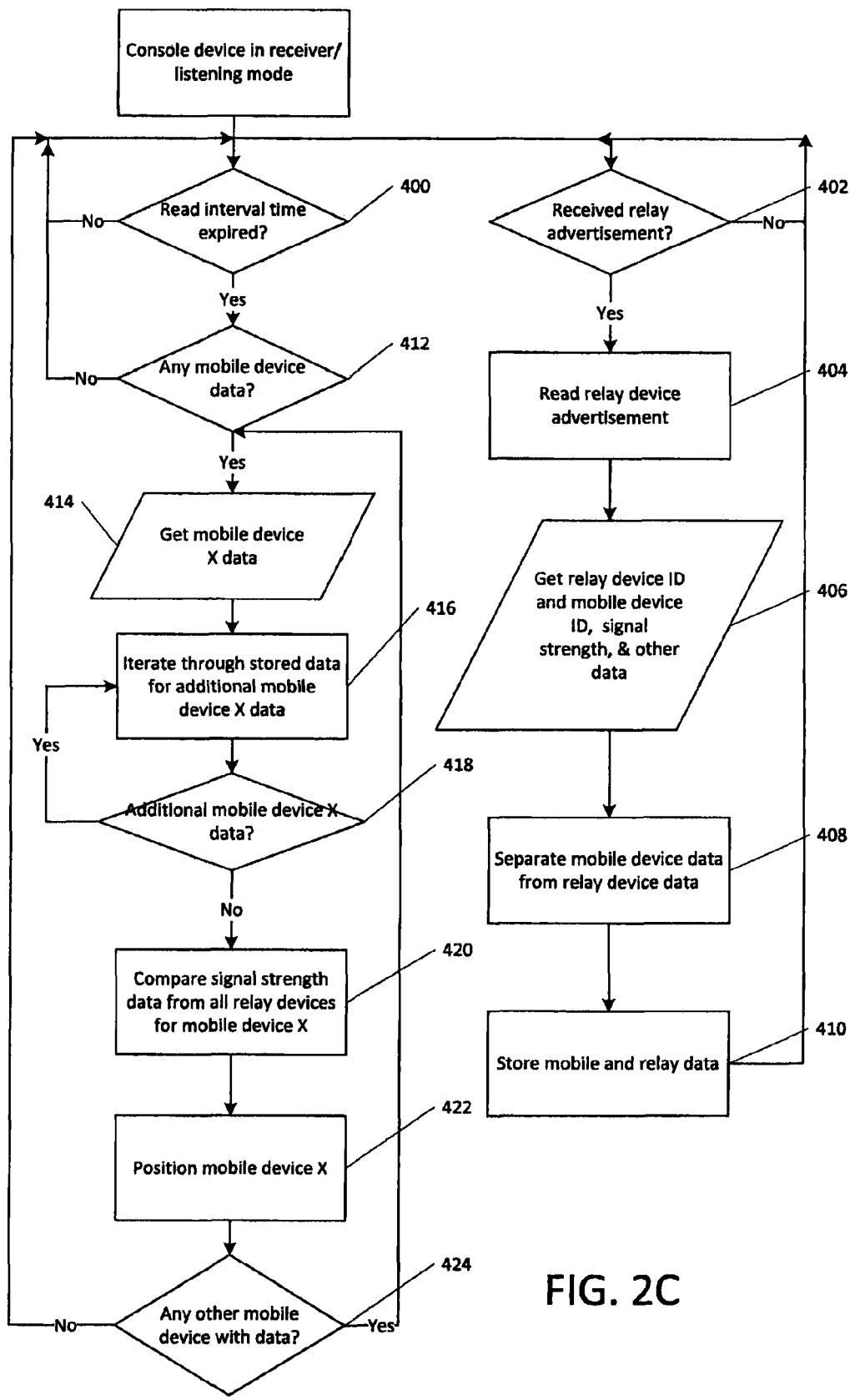
FIG. 2C is a flowchart showing a control loop for a console device of the present disclosure.

Accordingly, each of the mobile devices 16, relay devices 12, and the console device 14 are routinely monitoring/receiving and/or transmitting data. Consequently, each of the three categories of devices operates according to its own control loop. FIG. 2A is a flowchart showing a control loop for a mobile device 16, FIG. 2B is a flowchart showing a control loop for a relay device 12, and FIG. 2C is a flowchart showing a control loop for the console device 14. The method then returns to step 202 to determine whether the timer has expired.

In FIG. 2A, in step 200 the mobile device 16 is activated. In step 202, the mobile device 16 determines whether a timer has expired. The timer determines how often the mobile device 16 transmits its beacon signal. In some implementations the timer has a maximum duration of 15 to 30 seconds.

In steps 204, 206, and 208, if the timer has expired, the mobile device 16 retrieves its own identifier and constructs an advertisement packet to be broadcast as the mobile device's beacon signal. In step 210, the mobile device 16 transmits the beacon signal.

In FIG. 2B, the relay device 12, in step 300, determines whether it has received a beacon signal from a mobile device 16. If no, the relay device determines in step 302 whether its own heartbeat timer has expired. If not, the relay device continues monitoring for transmissions from a mobile device 16 and checking to see if its own heartbeat timer has expired. If the heartbeat timer of the relay device has expired, the relay device, in steps 304, 306, and 308, retrieves information necessary to construct its own heartbeat signal—a beacon signal that includes only the relay device's identifier information—and then builds the heartbeat signal. In step 310 the heartbeat signal is transmitted. This heartbeat signal will then be received by the console device 14 allowing the console device 14 to determine that the relay device 12 is still operational.

If, in step 300, the relay device 12 determines that it has received a signal from a mobile device 16, the relay device 12, in steps 312 and 314, reads the beacon signal received from the mobile device 16 to retrieve the mobile device's identifier and to identify a signal strength of the received signal. In steps 316 and 318, the relay device retrieves its own identifier, and in step 320 the relay device constructs a beacon message that includes the identifier of the mobile device 16, the signal strength, and the identifier of the relay device 12. In step 322 the beacon message is transmitted by the relay device 12. In some implementations, the relay device 12 may temporarily store mobile device 16 data in order to more efficiently package multiple mobile device 16 data records into a single retransmission.

In FIG. 2C, in step 400 the console device 14 determines whether a read interval has expired. The read interval determines a period of time over which the console devices listens for and collects transmissions from the relay devices 12. In step 402, the console device 14 determines whether it has received a transmission from a relay device 12. Accordingly, while the read interval timer is counting down (see step 400), the console device 14 is constantly monitoring for transmissions from the relay device 12. If a transmission is received from a relay device 12, in step 404, the console device reads the transmission. In some implementations, the relay device 12 will authenticate that one of the authorized services such as the 'Flex Ad Service' is being advertised before proceeding to read the mobile device 16 data. In step 406, the transmission is analyzed to determine the identifier for the transmitting relay device 12 and the encoded identifier of the mobile device 16, and the signal strength. In step 408, the relay device 12 data and the mobile device 16 data are separated and in step 410 the data is stored in a database or dynamic storage system. Note that if the received signal is a heartbeat signal from a relay device 12, the signal may not include any information regarding an identifier of a mobile device 16 and/or a signal level.

This monitoring for relay device 12 transmissions continues until the read interval timer expires in step 400. When the read interval timer expiries, in step 412 the console device determines whether any mobile device 16 data has been received. If not, the process resets. If data has been received, in step 414 the mobile device data associated with a particular mobile device (i.e., associated with the same mobile device identifier) are retrieved from the database or dynamic storage system. In steps 416 and 418, all of the available mobile device data is iterated through and in step 420 the received signal strength data for all the mobile device data is analyzed. This enables to console device to determine the relay device 12 that the mobile device 16 was closest to. Accordingly, if multiple relay devices 12 were to have detected the same beacon signal transmitted by a mobile device 16, the console device 14 can use the received signal strength data to identify the relay device 12 that was closest to the mobile device 16 at the time (i.e., the relay device 12 that observed the highest signal level). Accordingly, in step 422, after analyzing the received signal strength data, the console device 14 can determine a position or location for the mobile device 16. In step 424, the console device 14 determines whether any data is available for other mobile devices 16. If so, the location of those mobile devices 16 can be determined in a similar fashion. If not, the console device returns to listening for new transmissions from relay devices 12.

Figure 3:
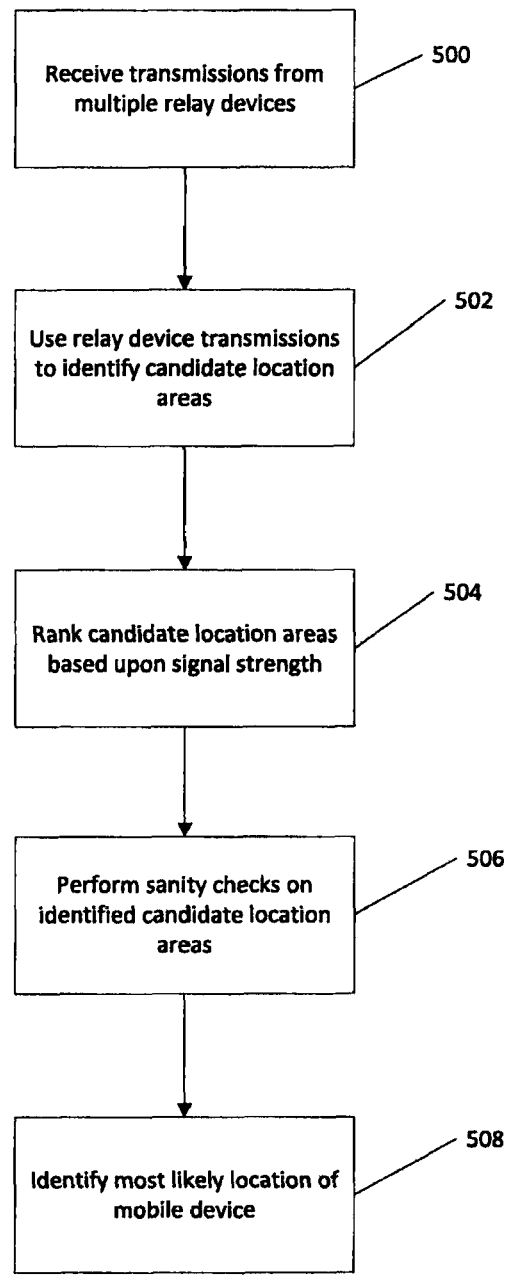
FIG. 3 is a flowchart illustrating a method for location a mobile device.
Figure 4:
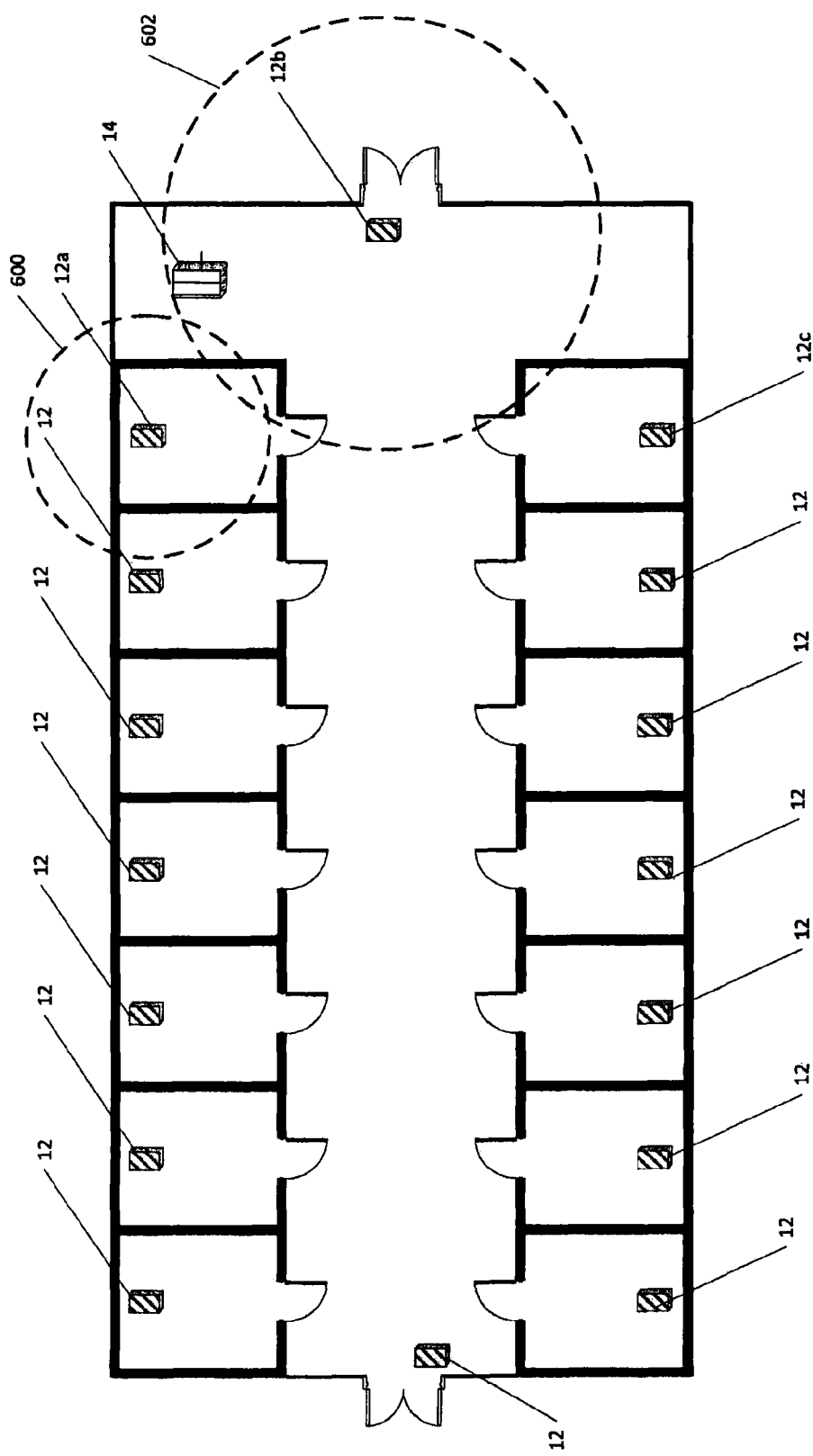
FIG. 4 is an illustration of a second example environment in which the present system may be utilized.

One example approach that may be utilized by console device 14 for determining the location of a mobile device 16 using the received signal level data is illustrated in FIG. 3. In step 500, relay device 12 transmissions are received from multiple relay devices 12 for a particular mobile device 16. As described above, each transmission identifies the signal strength of a signal received by the corresponding relay device 12 from the mobile device 16. In step 502 the relay device 12 transmissions are used to identify a number of candidate location areas in which the corresponding mobile device 16 may be located. The candidate location areas are generally defined as zones that surround each of the relay devices 12 that received a transmission from the mobile device 16 and transmitted a corresponding transmission to console device 14. For example, with reference to FIG. 4, if relay device 12 transmissions were received from relay devices 12a and 12b, two candidate location areas 600 and 602, respectively, can be defined in which the mobile device 16 may be located. Although the candidate location areas are depicted as having a circular border, the areas may, in fact, take on any suitable shape and size.

In step 504, the candidate location areas are ranked based upon the signal strength of the signal received from the mobile device. The candidate location area corresponding to the relay device 12 that had the highest received signal level from the mobile device 16 will be ranked first, and so on in order of decreasing signal level.

In step 506, a sanity check is performed on the candidate location area having the highest ranking. The sanity check may involve analyze the mobile device's 16 previously-identified locations to see if the first candidate location area represents a feasible location for the mobile device 16. For example, with reference to FIG. 4, if the mobile device 16 was identified as being in a zone nearby relay device 12c as recently as 2 seconds ago, it may be infeasible that the mobile device 16 is now located in candidate location area 600, even if relay device 12a detected the highest signal level.

If the highest-ranked candidate location area does not satisfy the sanity check of step 506, the other candidate location areas are checked in order of received signal level strength to identify a candidate location area that does satisfy the sanity check. When such a candidate location area is identified, in step 508, that candidate location area is identified as the most likely location of the mobile device 16.

In another embodiment, where it is assumed that the signal strength data varies in a predictable manner with transmission distance, it may be possible to calculate, based upon the signal strength value of each signal received by the relay devices 12 the distance that the mobile device 16 was from each relay device 12 that received the mobile device's 16 broadcast signal. Having calculated those distances, boundaries (e.g., circles) can be drawn about each of the relay devices 12 that received a signal from the mobile device 16, where the radius of each boundary is equal to the calculated distance. Having generated the boundaries, the point at which all of the boundaries overlap or intersect represent candidate locations for the mobile device 16. Having determined a number of candidate locations, console device 14 may then identify the most likely location of the mobile device 16 using any suitable method.

In various embodiments, the present system and method may be implemented by computer programs for execution by, for example, a microprocessor of one or more of the devices described herein for performing steps of a method according to the disclosure when run on the microprocessor or enabling a programmable apparatus to perform functions of a device or system according to the disclosure. The computer programs may for instance include one or more of: a subroutine, a function, a procedure, an object method, an object implementation, an executable application, an applet, a servlet, a source code, an object code, a shared library/dynamic load library and/or other sequence of instructions designed for execution on a computer system or microprocessor. The computer program may be provided on a data carrier, stored with data loadable in a memory of a computer system, the data representing the computer program. The data carrier may comprise, by way of example, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

In the foregoing specification, the invention has been described with reference to specific examples of embodiments of the invention. It will, however, be evident that various modifications and changes may be made therein without departing from the scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the devices implementing embodiments of the invention are, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the examples of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented that achieve the same functionality. In an abstract, but still definite sense, any arrangement of components or devices to achieve the same functionality is effectively associated such that the desired functionality is achieved.

It will therefore be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A system, comprising:
    a mobile device configured to transmit a beacon signal encoding an identifier of the mobile device;
    a relay device having a known location and being configured to:
        receive the beacon signal from the mobile device, the beacon signal having a signal level, encode the identifier of the mobile device, the signal level, and an identifier of the relay device into a message, and transmit the message; and a console device including a database mapping the identifier of the relay device to a location of the relay device, the console device being configured to receive the message from the relay device, and decode the message received from the relay device to identify an approximate location of the mobile device using the identifier of the mobile device, the signal level, and the identifier of the relay device.

2. The system of claim 1, wherein the beacon signal is transmitted using BLUETOOTH Low Energy (BLE).

3. The system of claim 1, wherein the message identifies a status of a battery of the mobile device.

4. The system of claim 1, wherein the message is encapsulated in a wireless communication packet.

5. The system of claim 4, wherein the message identifies a status of a battery of the relay device.

6. The system of claim 1, wherein the console device is configured to identify the approximate location of the mobile device using the location of the relay device.

7. The system of claim 6, wherein the console device is configured to convert the signal level into an area or distance.

8. The system of claim 7, wherein the console device is configured to calculate a plurality of potential locations of the mobile device using the area or distance.

9. A relay device having a location known to a console device, comprising:

a processor, the processor being configured to:

receive a beacon signal from a mobile device, the beacon signal encoding an identifier of the mobile device and having a signal level, encode the identifier of the mobile device, the signal level, and an identifier of the relay device into a message, and transmit the message to the console device, the console device including a database mapping the identifier of the relay device to a location of the relay device and being configured to decode the message received from the relay device to identify an approximate location of the mobile device using the identifier of the mobile device, the signal level, and the identifier of the relay device.

10. The relay device of claim 9, wherein the beacon signal is transmitted using BLUETOOTH Low Energy (BLE).

11. The relay device of claim 9, wherein the message identifies a status of a battery of the mobile device.

12. The relay device of claim 9, wherein the message is encapsulated in a wireless communication packet.

13. The relay device of claim 12, wherein the message identifies a status of a battery of the relay device.

14. A method, comprising:

receiving, by a relay device having a location known to a console device, a beacon signal from a mobile device, the beacon signal encoding an identifier of the mobile device and having a signal level, encoding, by the relay device, the identifier of the mobile device, the signal level, and an identifier of a relay device into a message, and transmitting, by the relay device, the message to the console device, the console device including a database mapping the identifier of the relay device to a location of the relay device and being configured to decode the message to identify an approximate location of the mobile device using the identifier of the mobile device, the signal level, and the identifier of the relay device.

15. The method of claim 14, wherein the beacon signal is transmitted using BLUETOOTH Low Energy (BLE).

16. The method of claim 14, wherein the message identifies a status of a battery of the mobile device.

17. The method of claim 14, wherein the message is encapsulated in a wireless communication packet.

18. The method of claim 17, wherein the message identifies a status of a battery of the relay device.

* * * * *